United States Patent [19]
Hasebe et al.

[11] Patent Number: 5,396,968
[45] Date of Patent: Mar. 14, 1995

[54] DRIVE MECHANISM FOR ELECTRIC CAR

[75] Inventors: Masahiro Hasebe; Satoru Wakuta, both of Anjo, Japan

[73] Assignee: Aisin Aw Co., Ltd., Japan

[21] Appl. No.: 33,791

[22] Filed: Mar. 17, 1993

[30] Foreign Application Priority Data

Mar. 18, 1992 [JP] Japan .................................. 4-062587
Mar. 31, 1992 [JP] Japan .................................. 4-077564

[51] Int. Cl.$^6$ ........................... B60K 1/02; B60K 41/26
[52] U.S. Cl. ..................... 180/65.6; 180/233; 180/244; 180/247; 180/248; 192/4 A; 475/6; 475/150
[58] Field of Search ............. 475/5, 6, 9, 149–151; 192/4 A, 4 R; 180/65.6, 233, 244, 247, 248

[56] References Cited

U.S. PATENT DOCUMENTS 2,578,837 12/1951 Raney ........................... 475/5
4,369,867 1/1983 Lemieux ........................ 192/4 A
4,729,258 3/1988 Mohri et al. .................... 475/5
5,014,800 5/1991 Kawamoto et al. ............ 180/65.6

FOREIGN PATENT DOCUMENTS 62-227818 10/1987 Japan ........................... 475/5

Primary Examiner—John J. Vrablik
Attorney, Agent, or Firm—Lorusso & Loud

[57] ABSTRACT

A drive mechanism for an electric car which has a plurality of motors arranged in a drive mechanism case which, in turn rotatably supports a shaft at two points. This shaft transmits the rotation generated by the motors to drive shafts for rotation of the wheels to run the car. The motors are composed of stators having armature cores and coils, and rotors. The stators are fixed in the drive mechanism case and the rotors are supported by the shaft. Since this shaft is rotatably supported at two points by the drive mechanism case, accurate centering of the rotor is maintained.

12 Claims, 3 Drawing Sheets

DRIVE MECHANISM FOR ELECTRIC CAR

BACKGROUND OF THE INVENTION

1. Field of the Invention

The present invention relates to a drive mechanism for an electric car.

2. Description of the Prior Art

In a conventional gasoline engine car rotation generated by a prime mover or a gasoline engine is changed in speed through a transmission such as an automatic transmission or a manual transmission and transmitted to drive wheels. Since the gasoline engine creates energy by burning an air-gasoline mixture under compression, noise is produced by the combustion and, worse, the environment is contaminated by the engine exhaust gases.

On the other hand, an electric car produces neither noise nor exhaust gases. However, the electric car of the prior art is restricted in the amount of electricity which can be stored in the battery so that its cruising distance is short. In order to achieve a sufficient cruising distance, therefore, it is necessary to mount a large-sized battery. Further, a motor of a size allowing it to be mounted on an ordinary vehicle generates a lower torque than that produced by an engine so that the vehicle can neither start quickly nor run under a high load or at a high speed.

Moreover, if the electric motor is arranged coaxially with the drive shafts to run the electric car, its diameter is restricted by the required minimum road clearance.

The foregoing has led to consideration of use of motors corresponding in number to the number of drive wheels so that the individual motors may be small sized while improving the running performance of the car. To the extent that the motors can be small-sized, it is possible to reduce the weight of the car and to facilitate mounting of the motors.

However, a reduction in the size of the motors requires a reduction in the size of the rotor supporting structure, at a sacrifice of accuracy and rigidity.

SUMMARY OF THE INVENTION

The present invention has as an object solution of the above-specified problems of the electric car of the prior art and provides a drive mechanism for an electric car which can reduce the size of the motors without sacrificing the accuracy and rigidity, which can reduce the weight of the car thereby increasing driving distance and which can facilitate mounting.

Another object of the present invention is to provide a drive mechanism for an electric car, which applies no stress to the rotors of the motors.

In order to achieve these objects, in the drive mechanism for an electric car according to the present invention, a plurality of motors are arranged in a drive mechanism case, by which a shaft is rotatably supported at two points. This shaft transmits the rotation generated by the motors to drive shafts.

Moreover, each of the motors is composed of a stator having an armature core, a coil and a rotor, with the stator fixed within the drive mechanism case and the rotor supported by the shaft.

Since the shaft is rotatably supported at two points by the drive mechanism case, the centering of the rotor can be achieved with high accuracy by the simple support structure. As a result, the motors can be small-sized.

Since the size of the motors can be thus reduced, it is possible to reduce the weight of the vehicle, to increase the cruising distance and to facilitate the mounting.

DESCRIPTION OF THE PREFERRED EMBODIMENTS

Embodiments of the present invention will be described in detail in the following with reference to the accompanying drawings.

Figure 1:
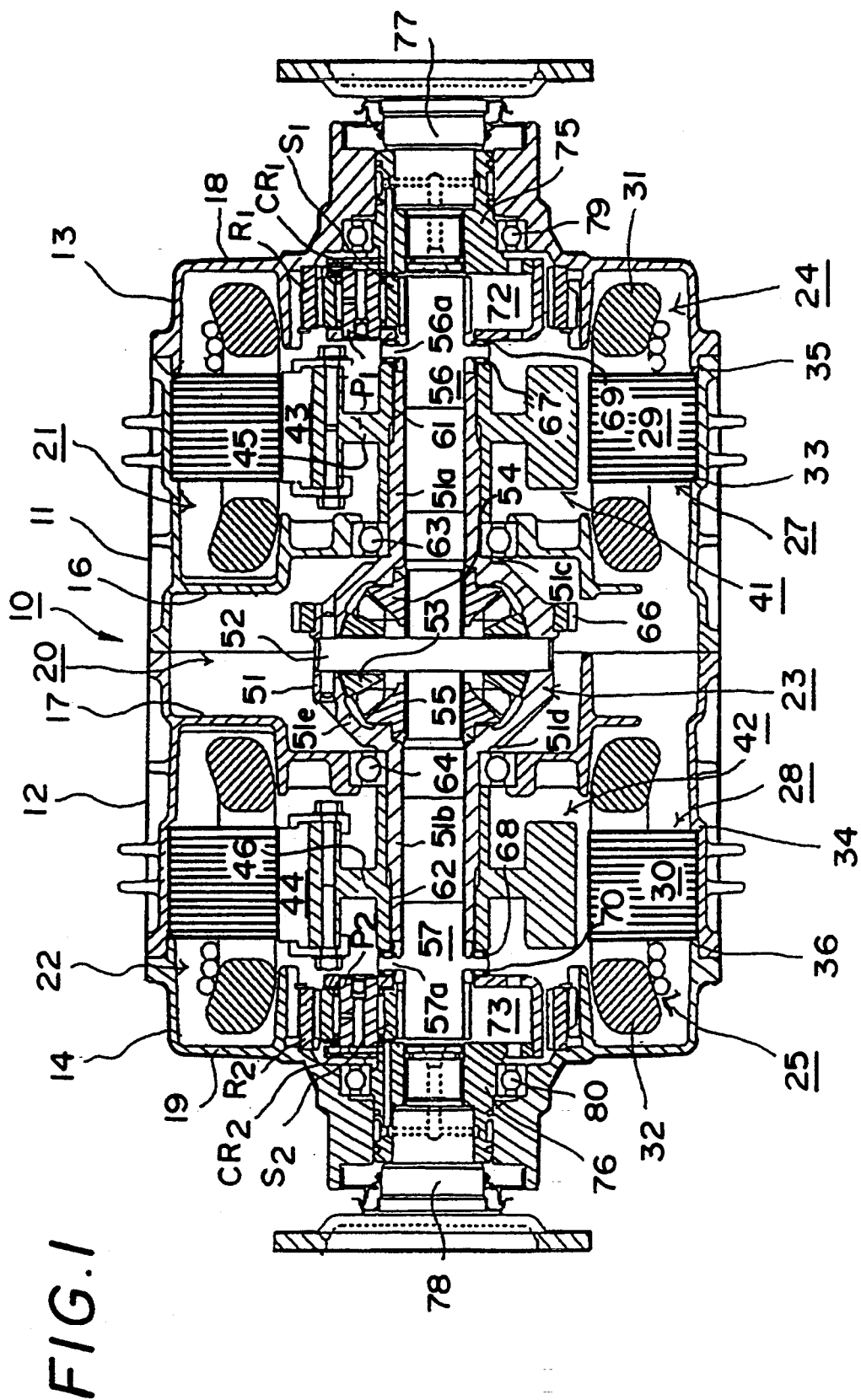
FIG. 1 is a cross-sectional view of a drive mechanism for an electric car according to one embodiment of the present invention.

In FIG. 1: reference numeral 10 designates a drive mechanism case; numeral 11 designates a cylindrical first center case; and numeral 12 designates a cylindrical second center case. The first and second center cases 11 and 12 have their opposed end faces joined by suitable fixing means. A cup-shaped first side case 13 is joined to the first center case 11, and a cup-shaped second side case 14 is joined to the second center case 12. The first and second center cases 11 and 12 have, respectively, partitions 16 and 17 extending toward their centers, and the first and second side cases 13 and 14 have, respectively, annular plate portions 18 and 19 extending toward their centers.

The first and second center cases 11 and 12 are joined and the first and second side cases 13 and 14 are faucet-jointed to the first and second center cases 11 and 12. As a result, a differential mechanism chamber 20 is formed between the partitions 16 and 17 and motor chambers 21 and 22 are formed, respectively, between the partition 16 and the annular plate portion 18 and between the partition 17 and the annular plate portion 19. A differential mechanism 23 is housed in the differential mechanism chamber 20 and a plurality of, e.g., a pair of first and second motors 24 and 25, are housed in the motor chambers 21 and 22. The partitions 16 and 17 have bulged sections at their centers extending axially of the first and second motors 24 and 25 toward the wheels (i.e., to the right and left of the drawing) to thereby form chamber 20 for housing the differential mechanism 23.

The first and second motors 24 and 25 have their stators 27 and 28 fixed to the inner circumferential walls of the first and second center cases 11 and 12. The stators 27 and 28 are respectively composed of armature cores 29 and 30 and coils 31 and 32. The armature cores 29 and 30 are clamped and positioned between steps 33 and 34 formed in the inner circumferential walls of the first and second center cases 11 and 12 and steps 35 and 36 formed in the faucet-jointed portions between the first and second center cases 11 and 12 and the first and second side cases 13 and 14.

The rotors 41 and 42 of first and second motors 24 and 25 are composed of permanent magnets 43 and 44, which are rotatably mounted radially inward of and internal to the armature cores 29 and 30, and spindles 45 and 46 supporting the permanent magnets 43 and 44. These spindles 45 and 46 are, in turn, supported by the differential mechanism 23.

The differential mechanism 23 includes: a differential case 51 made of a material having a sufficient rigidity; a pinion shaft 52 extending through the differential case 51; a pinion 53 mounted on pinion shaft 52 with provision for rotation relative to the pinion shaft 52; and first and second side gears 54 and 55 meshed with the pinion 53.

The first and second side gears 54 and 55 differentiate the rotation transmitted to the differential case 51 and transmit the differentiated rotation to first and second drive shafts 56 and 57 extending laterally of the vehicle. The differential case 51 includes: cylindrical portions (acting as shafts) 51a and 51b extending around the first and second drive shafts 56 and 57; and a body portion 51e between the cylindrical portions 51a and 51b. The spindles 45 and 46 are supported by the cylindrical portions 51a and 51b.

The outer circumferences of the cylindrical portions 51a and 51b and the inner circumferences of the spindles 45 and 46 are meshed by means of splines 61 and 62, and bearings 63 and 64 are arranged between the outer circumferences of the innermost ends of the cylindrical portions 51a and 51b and the partitions 16 and 17 to thereby rotatably support the differential mechanism 23.

The cylindrical portions 51a and 51b and the first and second drive shafts 56 and 57 are rotatable relative to each other with a suitable clearance in-between. As a result, when the differential mechanism 23 differentially rotates, the first and second drive shafts 56 and 57 rotate relative to the cylindrical portions 51a and 51b.

A parking gear 66 is welded to the outer periphery of the differential case 51 within the differential mechanism chamber 20.

The first and second drive shafts 56 and 57 are formed integrally with annular projections 56a and 57a in the vicinity of their leading ends, and thrust bearings 67 and 68 are arranged between the projections 56a and 57a and the spindles 45 and 46. As a result, these spindles 45 and 46 are held in position by steps 51c and 51d, which are formed at the innermost ends of the cylindrical portions 51a and 51b of the differential case 51, the inner races of the bearings 63 and 64, the thrust bearings 67 and 68 and the projections 56a and 57a.

On shafts 56 and 57, at the wheel side of the projections 56a and 57a, are mounted planetary gear units 72 and 73 abutting thrust bearings 69 and 70. These planetary gear units 72 and 73 respectively include: sun gears $S_1$ and $S_2$; pinions $P_1$ and $P_2$ meshing with the sun gears $S_1$ and $S_2$; carriers $CR_1$ and $CR_2$ supporting the pinions $P_1$ and $P_2$; and ring gears $R_1$ and $R_2$ meshing with the pinions $P_1$ and $P_2$. The sun gears $S_1$ and $S_2$ are splined to the first and second drive shafts 56 and 57, and the ring gears $R_1$ and $R_2$ are splined to the first and second side cases 13 and 14.

The axial wheel sides of the carriers $CR_1$ and $CR_2$, are connected to wheel shafts 77 and 78 through transmission shafts 75 and 76. The wheel shafts 77 and 78 are rotatably supported by the first and second side cases 13 and 14 through the transmission shafts 75 and 76 and bearings 79 and 80.

Thus, the rotation of the planetary gear units 72 and 73 is input from the first and second drive shafts 56 and 57 to the sun gears $S_1$ and $S_2$, and the decelerated rotation is output from the carriers $CR_1$ and $CR_2$ to the transmission shafts 75 and 76 and then to the wheel shafts 77 and 78. Wheels (not shown) are connected to the wheel shafts 77 and 78 so that the vehicle is run by the rotation transmitted to the wheel shafts 77 and 78.

When the first and second motors 24 and 25 are energized, their rotors 41 and 42 are rotated, thereby rotating the differential case 51 through the splines 61 and 62. This rotation is differentiated in the differential mechanism 23 so that differentiated rotations are transmitted to the first and second drive shafts 56 and 57 through the side gears 54 and 55.

The rotation thus transmitted to the first and second drive shafts 56 and 57 is input to the sun gears $S_1$ and $S_2$ of the planetary gear units 72 and 73 and decelerated by the planetary units 72 and 73. The decelerated rotation is output from the carriers $CR_1$ and $CR_2$. The rotation thus output from the carriers $CR_1$ and $CR_2$ is transmitted through the transmission shafts 75 and 76 and the wheel shafts 77 and 78 to the wheels to thereby run the vehicle.

In the drive mechanism for an electric car thus constructed, the cylindrical portions 51a and 51b of the differential case 51 are rotatably supported at their innermost ends by the first and second center cases 11 and 12 through the bearings 63 and 64. And, the cylindrical portions 51a and 51b extend through the bearings 63 and 64 to the wheels to support the rotors 41 and 42 of the first and second motors 24 and 25.

As a result, accurate centering of the rotors 41 and 42 can be achieved with a simple support structure so that the first and second motors 24 and 25 can be small-sized.

Moreover, since the rotors 41 and 42 are supported by the cylindrical portions 51a and 51b of the differential case 51, rigidity can be enhanced to reduce the sizes of the first and second motors 24 and 25 accordingly. In addition, the differential mechanism chamber 20 is formed such that the coil ends, i.e., the end portions of the coils 31 and 32 of the first and second motors 24 and 25, and the body portion 51e of the differential mechanism 23 partially overlap in the axial direction. As a result, the axial size of the drive mechanism 10 can be reduced.

In addition, since the rotation transmitted to the first and second drive shafts 56 and 57 is decelerated by the planetary gear units 72 and 73, the torque transmitted by the differential mechanism 23 can be decreased to allow a reduction in the size of the differential mechanism 23.

As a result, it is possible to reduce the weight of the vehicle and to facilitate mounting of the first and second motors 24 and 25.

By joining the first and second center cases 11 and 12 and by faucet-jointing the first and second side cases 13 and 14 to the first and second center cases 11 and 12, the differential mechanism chamber 20 is formed between the partitions 16 and 17, and the motor chambers 21 and 22 are formed between the partition 16 and the annular plate portion 18 and between the partition 17 and the annular plate portion 19. As a result, assembly of the drive mechanism is facilitated.

First, the first and second center cases 11 and 12 with the stators 27 and 28 of the first and second motors 24 and 25 mounted therein are assembled with the differential mechanism 23, thus forming a subassembly. Next, the rotors 41 and 42 are inserted into the subassembly, and the first and second side cases 13 and 14 having the planetary gear units 72 and 73 mounted therein are joined to construct the drive mechanism of the electric car.

Orientation of the cylindrical portions 51a and 51b of the differential case 51 and the axial alignment of the stators 27 and 28 can be checked before the rotors 41 and 42 are inserted.

The differential case 51 is equipped with a parking gear 66, which can be selectively locked for parking the vehicle. If the driver manipulates the shift lever (not shown) to lock the parking gear 66, the torque transmitted from the wheels through the differential mechanism 23 is transmitted to the differential case 51 but no further because it is locked by the drive mechanism case 10. As a result, no stress is applied to the rotors 41 and 42 of the first and second motors 24 and 25 so that the clearances between the rotors 41 and 42 and the stators 27 and 28 is maintained at a proper value.

Moreover, since no stress is applied to the rotors 41 and 42, the density of magnetic flux established can be increased even if mechanically weak and electromagnetic soft iron may be used.

Figure 2:
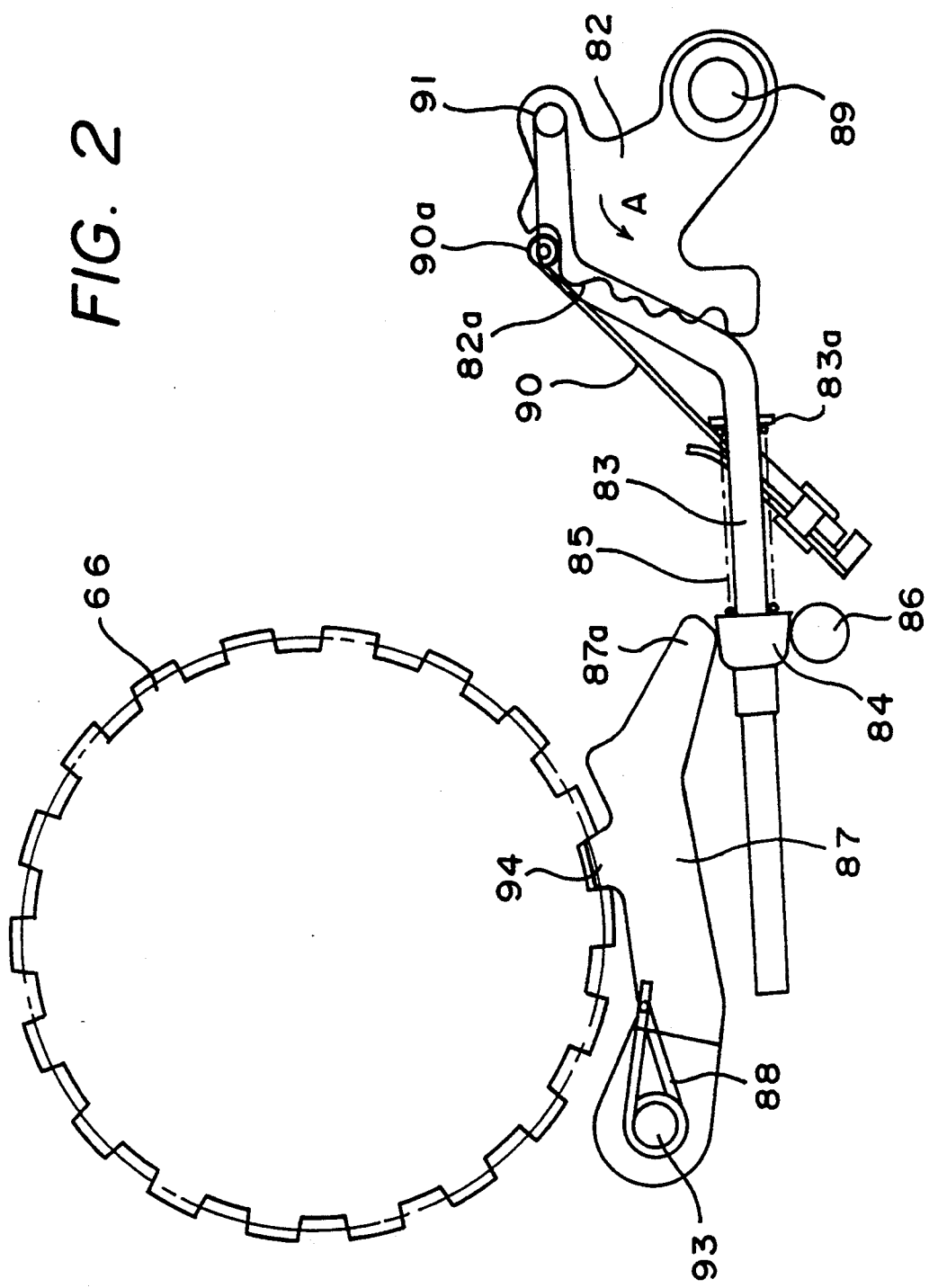
FIG. 2 is a detailed diagram showing a parking lock.

FIG. 2 shows the parking device as including a detent lever 82, a rod 83, a cam 84, a Stopper 86, a pawl 87, a torsion spring 88 and the parking gear 66.

The detent lever 82 is made of a plate member which is connected directly to a manual shaft 89. This manual shaft 89 can be turned by the manipulation of the shift lever (not shown) disposed in the vicinity of the driver's seat so that the plate member can rotate on and with the manual shaft 89. The detent lever 82 is formed in its peripheral edge with a plurality of engagement grooves 82a corresponding to the shift positions of the shift lever. These engagement grooves 82a are engaged by the leading end 90a of a detent spring 90. Hole 91 in the detent lever 82 rotatably retains the trailing end of the rod 83 so that the rod 83 is pushed forward by the turn of the detent lever 82.

The rod 83 carries, at its leading end, a slidably mounted cam 84, a projection 83a and a compression spring 85 therebetween, to form a cam rod. The cam 84 is formed with two steps of conical faces meeting at an apex directed toward the leading end of the rod 83. Thus, the cam 84 rotates the pawl 87 toward parking gear 66 when the rod 83 is pushed forward by rotation of detent lever 82 under pressure of the compression spring 85 which is arranged on the rod 83.

The cam 84 advances to enter the clearance between the leading end portion 87a of the pawl 87 and the stopper 86 as the detent lever 82 turns in the direction of arrow A. When the leading end portion 90a of the detent spring 90 comes into engagement with the engagement grooves 82a of the detent lever 82, the cam 84 pushes up the pawl 87. The pawl 87 is thus turned on pawl shaft 93 to bring its pawl portion 94 into engagement with the parking gear 66 to lock the vehicle. The pawl shaft 93 is fixed at a suitable position on the drive mechanism case 10 (as shown in FIG. 1).

On pawl shaft 93 is mounted torsion spring 88 which has one end retained by the drive mechanism case 10 and its other end retained by the pawl 87. The torsion spring 88 urges the leading end portion 87a of the pawl 87 toward the stopper 86.

Figure 3:
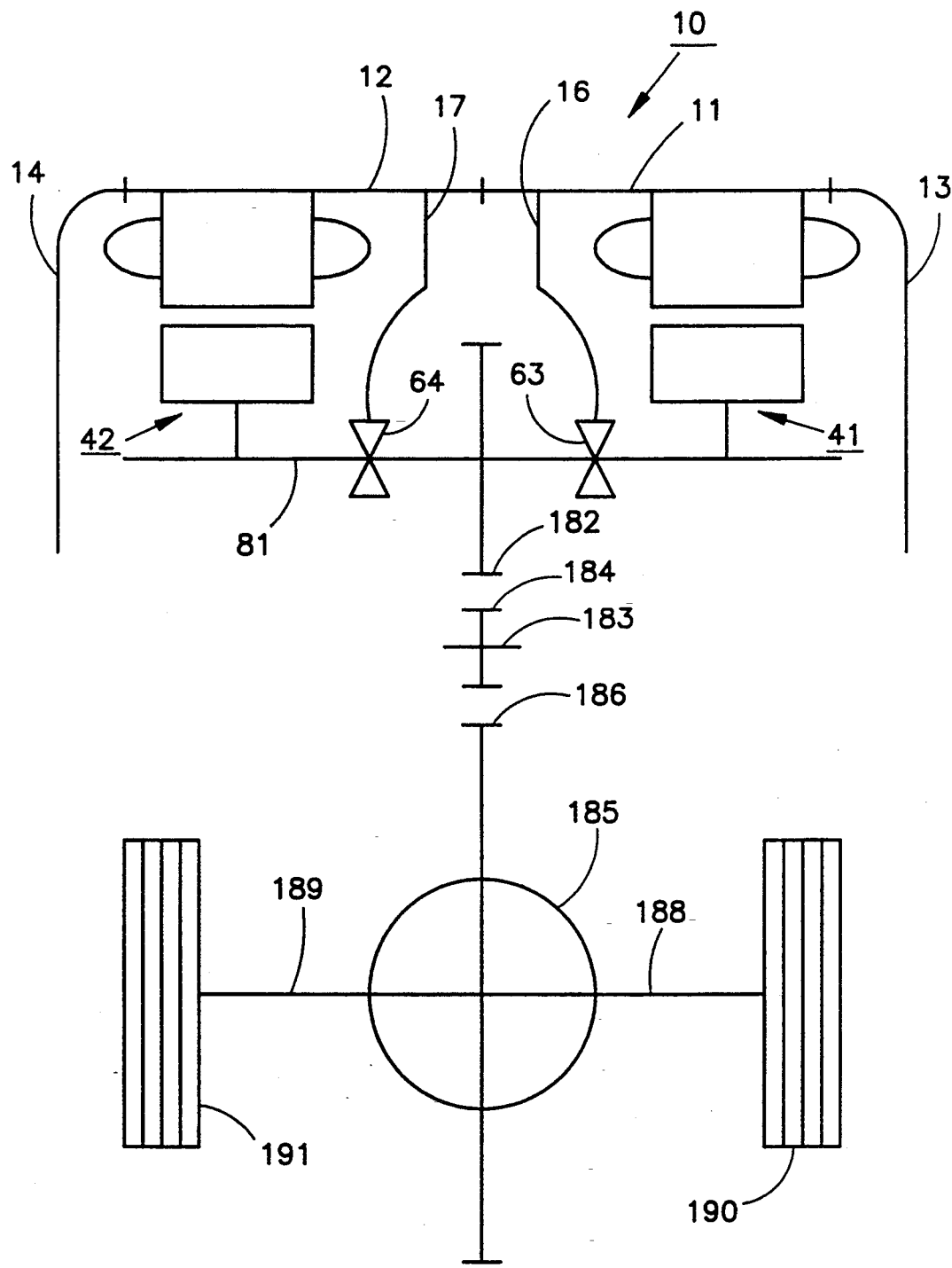
FIG. 3 is a schematic diagram showing a drive mechanism of an electric car according to a second embodiment of the present invention.

In FIG. 3: reference numeral 10 designates a drive mechanism case; numerals 11 and 12 designate first and second center cases; and numerals 13 and 14 designate first and second side cases. The partitions 16 and 17 of the first and second center cases 11 and 12 rotatably support, through the bearings 63 and 64, an intermediate transmission shaft 81, which in turn supports the rotors 41 and 42. The intermediate transmission shaft 81 is made of a material sufficiently rigid to maintain the rotors 41 and 42 centered.

The rotation transmitted to the intermediate transmission shaft 81 is transmitted to a differential mechanism 185 through a counter drive gear 182, which is mounted on the intermediate transmission shaft 81, a counter driven gear 184, which is mounted on a counter shaft 183, and a large output gear 186.

The rotation thus transmitted to the differential mechanism 185 is differentiated by the differential mechanism 185 so that the differentiated rotation is transmitted through first and second drive shafts 188 and 189 to the wheels 190 and 191.

The present invention should not be considered limited to the foregoing embodiments but can be modified in various manners without departing from the gist thereof, and such modifications are considered to be within the scope of the present invention.

What is claimed is:

1. A drive mechanism for a wheeled electric car, comprising:
   a drive case including first and second internal partitions;
   first and second drive shafts, mounted in said drive mechanism, for transmitting rotation to respective wheels;
   a single motor output shaft having cylindrical portions extending around said drive shafts and a body portion joining said cylindrical portions, said motor output shaft being rotatably supported at two points by said internal partitions for transmitting rotation to said drive shafts;
   a plurality of motors arranged coaxially in said drive mechanism case for rotatably driving said single motor output shaft, each of said motors including an armature coil, a rotor and a stator, said stators being fixed to said drive mechanism case and said rotors being connected to said motor output shaft and arranged radially and internally within said stator; and
   a differential mechanism, located within said body portion, for receiving and differentiating the rotation transmitted from said single motor output shaft and transmitting differentiated separate rotary outputs to said first and second drive shafts.

2. A drive mechanism for a wheeled electric car according to claim 1, wherein said rotor and said motor output shaft are splined together.

3. A drive mechanism for a wheeled electric car according to claim 1, wherein said cylindrical portions and said drive shafts are rotatable relative to each other with a suitable clearance in-between.

4. A drive mechanism for a wheeled electric car according to claim 1, further comprising a plurality of planetary gear units for transmitting power from said motors to said wheels, each of said planetary gear units provided in said drive mechanism case, between one of said drive shafts and one of said wheels.

5. A drive mechanism for a wheeled electric car according to claim 1, wherein said stators and said differential mechanism are partially overlapped in an axial direction.

6. A drive mechanism for a wheeled electric car according to claim 1, wherein said differential mechanism includes:
   a pinion shaft connected to said motor output shaft;
   a pinion mounted on said pinion shaft for rotation relative to said pinion shaft;

a pair of gears meshed with said pinion for transmitting rotation from said pinion to said first and second drive shafts.

7. A drive mechanism for a wheeled electric car according to claim 1, wherein said drive mechanism case includes first and second center case sections, respectively having said internal partitions and respectively housing said motors, and wherein said single motor output shaft is rotatably supported by bearings mounted on said internal partitions.

8. A drive mechanism for a wheeled electric car according to claim 7, wherein said drive mechanism case further includes first and second side case sections faucet-jointed, respectively, to said first and second center case sections.

9. A drive mechanism for a wheeled electric car according to claim 8, wherein each stator is clamped in position between one of said side case sections and a step formed on one of said center case sections.

10. A drive mechanism for a wheeled electric car comprising:
   a drive mechanism case including first and second internal partitions;
   first and second drive shafts mounted in said drive mechanism case for transmitting rotation to respective wheels;
   plural motors arranged coaxially in said drive mechanism case, each of said motors including an armature coil, a rotor and a stator, said stators being fixed to said drive mechanism case and said rotor being arranged radially and internally within respective stators;
   a differential mechanism case having cylindrical portions connected to said rotors and extending around said drive shafts and a body portion joining said cylindrical portions, said cylindrical portions being rotatably supported, respectively, by said internal partitions for transmitting rotation to said drive shafts;
   a differential mechanism located in said body portion, for receiving and differentiating the rotation, transmitted from said plural motors through said differential mechanism case, and for transmitting differentiated separate rotary outputs to said first and second drive shafts;
   a parking gear on said differential mechanism case; and
   means for selectively locking said parking gear.

11. A drive mechanism for a wheeled electric car according to claim 10, further comprising a plurality of planetary gear units for transmitting power from said motors to said wheels, each of said planetary gear units being provided, within said drive mechanism case, between one of said drive shafts and one of said wheels.

12. A drive mechanism for a wheeled electric car according to claim 10, wherein said differential mechanism includes:
   a pinion shaft connected to said differential mechanism case;
   a pinion mounted on said pinion shaft for rotation relative to said pinion shaft; and
   a pair of gears meshed with said pinion for transmitting rotation from said pinion to said first and second drive shafts.

* * * * *

UNITED STATES PATENT AND TRADEMARK OFFICE
CERTIFICATE OF CORRECTION

PATENT NO. : 5,396,968
DATED : March 14, 1995
INVENTOR(S) : HASEBE et al

It is certified that error appears in the above-indentified patent and that said Letters Patent is hereby corrected as shown below:

Col. 5, line 21, "Stopper" should read --stopper--.

Col. 6, line 22, after "drive" insert --mechanism--; and line 25, after "mechanism" insert --case--.

Signed and Sealed this

Thirty-first Day of October 1995

Attest:

BRUCE LEHMAN

Attesting Officer     Commissioner of Patents and Trademarks